(12) United States Patent
Kamischke et al.

(10) Patent No.: US 11,623,635 B2
(45) Date of Patent: Apr. 11, 2023

(54) AGRICULTURAL WORK VEHICLE AND CONTROL METHOD

(71) Applicant: WABCO Global GmbH, Bern (DE)

(72) Inventors: Waldemar Kamischke, Neustadt (DE); Dennis Sabelhaus, Rinteln (DE)

(73) Assignee: ZF CV Systems Global GmbH, Bern (CH)

( * ) Notice: Subject to any disclaimer, the term of this patent is extended or adjusted under 35 U.S.C. 154(b) by 252 days.

(21) Appl. No.: 17/064,854

(22) Filed: Oct. 7, 2020

(65) Prior Publication Data

US 2021/0107457 A1 Apr. 15, 2021

(30) Foreign Application Priority Data

Oct. 9, 2019 (DE) ...................... 10 2019 127 129.0

(51) Int. Cl.
| | |
|---|---|
| *B60W 30/02* | (2012.01) |
| *B60K 1/00* | (2006.01) |
| *B60L 15/20* | (2006.01) |
| *B60W 10/08* | (2006.01) |
| *B60W 10/192* | (2012.01) |

(52) U.S. Cl.
CPC ............... *B60W 30/02* (2013.01); *B60K 1/00* (2013.01); *B60L 15/20* (2013.01); *B60W 10/08* (2013.01); *B60W 10/192* (2013.01); *B60W 2300/15* (2013.01); *B60W 2520/28* (2013.01)

(58) Field of Classification Search
CPC .... B60W 30/02; B60W 10/08; B60W 10/192; B60W 2300/15; B60W 2520/28; B60W 2520/16; B60W 2520/18; B60W 2720/103; B60W 2720/16; B60W 10/02; B60W 2720/14; B60W 2720/18; B60K 1/00; B60L 15/20
See application file for complete search history.

(56) References Cited

U.S. PATENT DOCUMENTS

2010/0017061 A1 1/2010 Lu et al.
2017/0290258 A1* 10/2017 Mollick ............... A01B 63/023
(Continued)

FOREIGN PATENT DOCUMENTS

DE 3942057 A1 6/1991
DE 102004035576 A1 2/2006
(Continued)

*Primary Examiner* — Marthe Y Marc-Coleman
(74) *Attorney, Agent, or Firm* — Dickinson Wright PLLC

(57) ABSTRACT

A working vehicle (2) for use in agriculture is configured for mounting a laterally protruding implement on the vehicle front or vehicle rear. The vehicle has an electronically controllable drive motor (4), an electronically controllable brake system (6), a sensor arrangement (8) for measuring rotational movements or rotational oscillations about at least one of three reference axes, and an electronic control device (10) for evaluating sensor data and for activating the drive motor (4) or the brake system (6). A data storage (50) stores threshold values for the sensor data. The control device determines characteristic values for the respective rotational movement or rotational oscillation and decides whether a reduction in travel speed is required in view of the threshold values. If true, the travel speed is reduced until the characteristic value reaches or falls below the threshold value.

20 Claims, 2 Drawing Sheets

(56) References Cited

U.S. PATENT DOCUMENTS

2018/0211450 A1* 7/2018 Gresch .................. G07C 5/008
2018/0332760 A1* 11/2018 Gresch .................. A01B 63/111

FOREIGN PATENT DOCUMENTS

| | | |
|---|---|---|
| DE | 102006023603 A1 | 11/2007 |
| DE | 102010054103 A1 | 6/2012 |
| DE | 102012216275 A1 | 3/2014 |
| DE | 102015205509 A1 | 9/2016 |
| DE | 102016214547 A1 * | 3/2017 |
| DE | 102016214547 A1 | 3/2017 |
| DE | 202015106595 U1 | 3/2017 |
| DE | 102017201040 A1 | 7/2018 |
| DE | 102017009954 A1 | 5/2019 |

* cited by examiner

AGRICULTURAL WORK VEHICLE AND CONTROL METHOD

TECHNICAL FIELD

The invention relates to a working vehicle for use in agriculture, on which a laterally protruding implement is mountable on the vehicle front or vehicle rear, with an electronically controllable drive motor, an electronically controllable brake system, a sensor arrangement for measuring rotational movements or rotational oscillations about at least one reference axis of the working vehicle, and with an electronic control device for evaluating sensor data of the sensor arrangement and for activating the drive motor or the brake system. The invention further relates to a method for controlling a such a working vehicle, which is suited for damping rotational movements about at least one reference axis of the working vehicle.

BACKGROUND

On working vehicles for use in agriculture, such as tractors and combine harvesters, implements such as mowing devices or spray booms may be mounted on the vehicle front or on the vehicle rear, the lateral dimensions thereof exceeding the width of the working vehicle. If a working vehicle having such an implement travels during operation over uneven terrain, such as a meadow or a field, protuberances and depressions in the ground may cause rotational movements and rotational oscillations of the working vehicle and of the implement, i.e. pitch movements and pitch oscillations about the transverse axis thereof, roll movements and roll oscillations about the longitudinal axis thereof, and yaw movements and yaw oscillations about the vertical axis thereof. As a result, this may lead to contact with the ground, in particular of the outermost portions of the respective implement, which may lead to damage of the implement and to contamination of the harvested crops, such as grass, rapeseed or cereals, with soil and rocks. The contaminants which are present then have to be removed in a complex manner from the harvested crops. Moreover, oscillations excited in the implement may lead to premature wear and fatigue fractures thereon. The implement then has to be repaired, resulting in a stoppage period. Similarly, excited pitch, roll or yaw movements or yaw oscillations may cause an uneven distribution of liquid or granular active agents, such as fertilizer or plant protection agents, on the relevant meadow or the field. Thus there is a need to detect such rotational movements and rotational oscillations of a working vehicle or of the implement thereof and to limit or to damp these rotational movements and rotational oscillations in a suitable manner.

An agricultural working machine having an implement mounted in an articulated manner on the vehicle rear and which may be lifted and lowered via a hydraulic adjusting device is disclosed in DE 39 42 057 A1. When the implement is in its transport position and the working machine has reached or exceeded a predetermined travel speed, an oscillation damping device may be activated, pitch oscillations which occur due to a vertical movement of the implement being damped thereby.

A mobile working machine having an implement mounted in an articulated manner on the vehicle front or the vehicle rear and which may be pivoted to the side by means of a hydraulic control device is disclosed in DE 10 2006 023 603 B4. If the implement is in its transport position, a damping device may be activated by which the implement, as a function of a yaw moment detected by sensor, is pivoted in the same direction, i.e. in the case of cornering into the inside of the curve, and thus oversteering of the working machine is prevented.

A mobile working machine having an implement mounted in an articulated manner on the vehicle front or the vehicle rear and adjustable vertically and to the side by means of a hydraulic control device is disclosed in DE 10 2010 054 103 A1. In travel mode, for preventing or damping roll, pitch or yaw movements of the working machine it is provided that the implement is appropriately lifted, lowered or pivoted transversely to the direction of travel.

The aforementioned devices and methods for stabilizing a working machine are limited to use in transport and transfer travel and thus may not be used in operational travel in which the relevant implement is used.

However, a working vehicle having a control device for damping a pitch movement which may also be used in operational travel is disclosed in DE 10 2012 216 275 A1. This control device is configured to detect by sensor a pitch movement of the working vehicle, and to determine an additional torque which may be controlled in the drive train of the working vehicle as a function of the detected pitch movement, the pitch movement of the working vehicle being able to be damped thereby. The control of the additional torque in the drive train may take place by a corresponding activation of the drive motor, the drive gear or the brake system.

A further control device for damping a pitch movement of a working vehicle, which may also be used in operational travel, is disclosed in DE 10 2015 205 509 A1. This control device comprises means for identifying an existing or anticipated pitch oscillation and at least one actuator for influencing the travel speed of the working vehicle. The actuator is activated such that the working vehicle is accelerated when the working vehicle tilts to the front and decelerated when the working vehicle tilts to the rear. The pitch oscillation of the working vehicle is thus damped by a dynamic displacement of the vehicle center of gravity to the rear or to the front.

The devices and methods disclosed in the two last-mentioned publications for stabilizing a working vehicle are limited to the damping of pitch movements and pitch oscillations and insufficiently disclosed regarding the practical embodiment thereof.

SUMMARY

Throughout this specification and the appended claims, the word "or" is used in the inclusive sense and means that either one or both of the terms separated by the "or" are included.

The invention discloses a working vehicle having a sensor arrangement and an electronic control device of the type mentioned in the introduction. The electronic control device is configured to detect rotational movements or rotational oscillations of the working vehicle about all relevant reference axes of a vehicle and to activate the drive motor or the brake system of the working vehicle in a suitable manner in order to damp the respective rotational movement or rotational oscillation. Moreover, a method for controlling a corresponding working vehicle is disclosed for damping rotational movements about at least one reference axis of the working vehicle.

According to a first aspect of the invention, a working vehicle for use in agriculture is configured for mounting a laterally protruding implement on the vehicle front or vehicle rear thereof. The working vehicle an electronically controllable drive motor, an electronically controllable brake system, a sensor arrangement for measuring rotational movements or rotational oscillations about at least one reference axis of the working vehicle, and having an electronic control device for evaluating sensor data of the sensor arrangement and for activating the drive motor or the brake system.

For achieving the device-related object in this working vehicle it is provided that the sensor arrangement comprises at least one sensor for measuring rotational movements or rotational oscillations about the transverse axis of the working vehicle, at least one sensor for measuring rotational movements or rotational oscillations about the longitudinal axis of the working vehicle and at least one sensor for measuring rotational movements or rotational oscillations about the vertical axis of the working vehicle. Moreover, it is provided that an electronic data storage is assigned to the electronic control device, threshold values for a rotational movement or a rotational oscillation about the transverse axis, the longitudinal axis and the vertical axis of the drive vehicle being stored therein. Additionally, the electronic control device is configured such that it is able to determine, from the measured values of rotational movements or rotational oscillations detected by sensor, characteristic values relevant thereto for the respective rotational movement or rotational oscillation about the transverse axis, the longitudinal axis and the vertical axis, that as a function of at least one of these characteristic values and the assigned threshold value the electronic control device is able to decide whether a reduction in travel speed is required and that in the case of a positive decision relative thereto the electronic control device is able to activate the drive motor or the brake system such that the travel speed is reduced until the characteristic value reaches or falls below the relevant threshold value.

By the configuration according to the invention of the sensor arrangement, pitch movement or pitch oscillations, roll movements or roll oscillations and yaw movements or yaw oscillations of the working vehicle may be measured by sensor and processed in the electronic control device to form one respective characteristic value. By comparing the respective characteristic value with a predetermined threshold value it may be decided whether the relevant rotational movement or rotational oscillation is to be limited or damped by a reduction in the travel speed of the working vehicle. In the case of a positive decision, the drive motor or the brake system may be activated in a suitable manner in order to damp the respective rotational movement or rotational oscillation.

In contrast to the known devices of a working vehicle, the sensor arrangement and the electronic control device are configured to detect rotational movements or rotational oscillations of the working vehicle about all relevant reference axes or spatial axes and to damp these rotational movements or rotational oscillations by a reduction in the travel speed of the working vehicle.

The working vehicle may be configured such that the electronic control device is configured such that it is able to determine automatically the threshold values for a rotational movement or a rotational oscillation about the transverse axis, about the longitudinal axis and about the vertical axis of the working vehicle using data detected by sensor and is able to perform automatically an identification of the respectively fitted implement and store this in the electronic data storage.

Alternatively or additionally, an input device may be provided, into which a driver of the working vehicle may manually input an identifier of the fitted implement, the nature of the terrain to be traveled over and the threshold values for a rotational movement or rotational oscillation about the transverse axis, about the longitudinal axis and about the vertical axis of the working vehicle and store this in the electronic data storage.

The sensor arrangement for detecting the rotational movements or rotational oscillations about the transverse axis, about the longitudinal axis and about the vertical axis of the working vehicle may be a component of an existing ESC (Electronic Stability Control) module. ESC modules are already available as standard or at least as an option in modern tractors and combine harvesters.

The electronic control device or the control function for detecting and damping the rotational movements or rotational oscillations about the transverse axis, longitudinal axis and vertical axis of the working vehicle may be integrated in an existing speed control system. Speed control systems are also already available as standard or as an option in modern tractors and combine harvesters.

The invention further relates to a method for solving the aforementioned process-technical object. The method serves to control a working vehicle for use in agriculture, with a laterally protruding implement mountable on the vehicle front or vehicle rear thereof, and with an electronically controllable drive motor, an electronically controllable brake system, a sensor arrangement for detecting rotational movements or rotational oscillations about at least one of the reference axes of the working vehicle and an electronic control device for evaluating sensor data of the sensor arrangement and for activating the drive motor or the brake system.

According to the method a rotational movement or a rotational oscillation about the transverse axis, about the longitudinal axis or about the vertical axis of the working vehicle may be measured by sensor, that in each case a characteristic value of the measured rotational movement or rotational oscillation is determined, that this characteristic value is compared with a predetermined threshold value and that when the characteristic value exceeds the stored threshold value, the travel speed of the working vehicle is reduced until the characteristic value has reached or fallen below the threshold value.

The characteristic value of the measured rotational movement about the transverse axis, about the longitudinal axis or about the vertical axis of the working vehicle is determined as rotational velocity or as rotational acceleration of the rotational movement and is compared with a threshold value that is a predetermined threshold rotational velocity or a predetermined threshold rotational acceleration.

The characteristic value of the measured rotational oscillation about the transverse axis, about the longitudinal axis or about the vertical axis of the working vehicle is determined as an oscillation amplitude or as an RMS value (Root Mean Square) of the rotational oscillation and is compared with a threshold value that is a predetermined threshold oscillation amplitude or a predetermined RMS threshold value.

In order to avoid interference in the sensor signals due to high frequency vibrations of the working vehicle or the implement, which are generally generated by mechanical imbalances, it is expedient if the sensor signals for the rotational movement or for the rotational oscillation about the transverse axis, about the longitudinal axis or about the vertical axis of the working vehicle are in each case low-pass filtered before the evaluation thereof in the electronic control device.

The travel speed of the working vehicle may be continuously reduced until the characteristic value of the rotational movement or the rotational oscillation has reached or fallen below the relevant threshold value. This procedure may, however, lead to too great a reduction in the travel speed of the working vehicle since the evaluation of the sensor data and the activation of the drive motor or the brake system take a certain length of time.

Alternatively, therefore, the travel speed of the working vehicle may also be reduced in a stepwise manner until the characteristic value of the rotational movement or rotational oscillation has reached or fallen below the relevant threshold value. As a result, in each case sufficient time is available for the evaluation of the sensor data and the activation of the drive motor or the brake system before the next step for reducing the travel speed is implemented, if required.

It may be further provided that, for reducing the travel speed of the working vehicle, the torque output from the drive motor or the rotational speed of the drive motor is reduced.

Alternatively or additionally, it may be provided that the travel speed of the working vehicle is reduced by such an activation of the brake system, which leads to an actuation of the service brakes of at least one brake circuit of the brake system. This, however, assumes an electronically controllable brake system in which the service brakes of at least one brake circuit are actuatable independently of the operating position of a foot brake valve. Several embodiments of such a compressed air brake system are disclosed, for example, in DE 10 2017 009 954 A1.

The invention is described in more detail hereinafter with reference to an exemplary embodiment shown in the accompanying drawings.

DETAILED DESCRIPTION OF THE DRAWINGS

Figure 1:
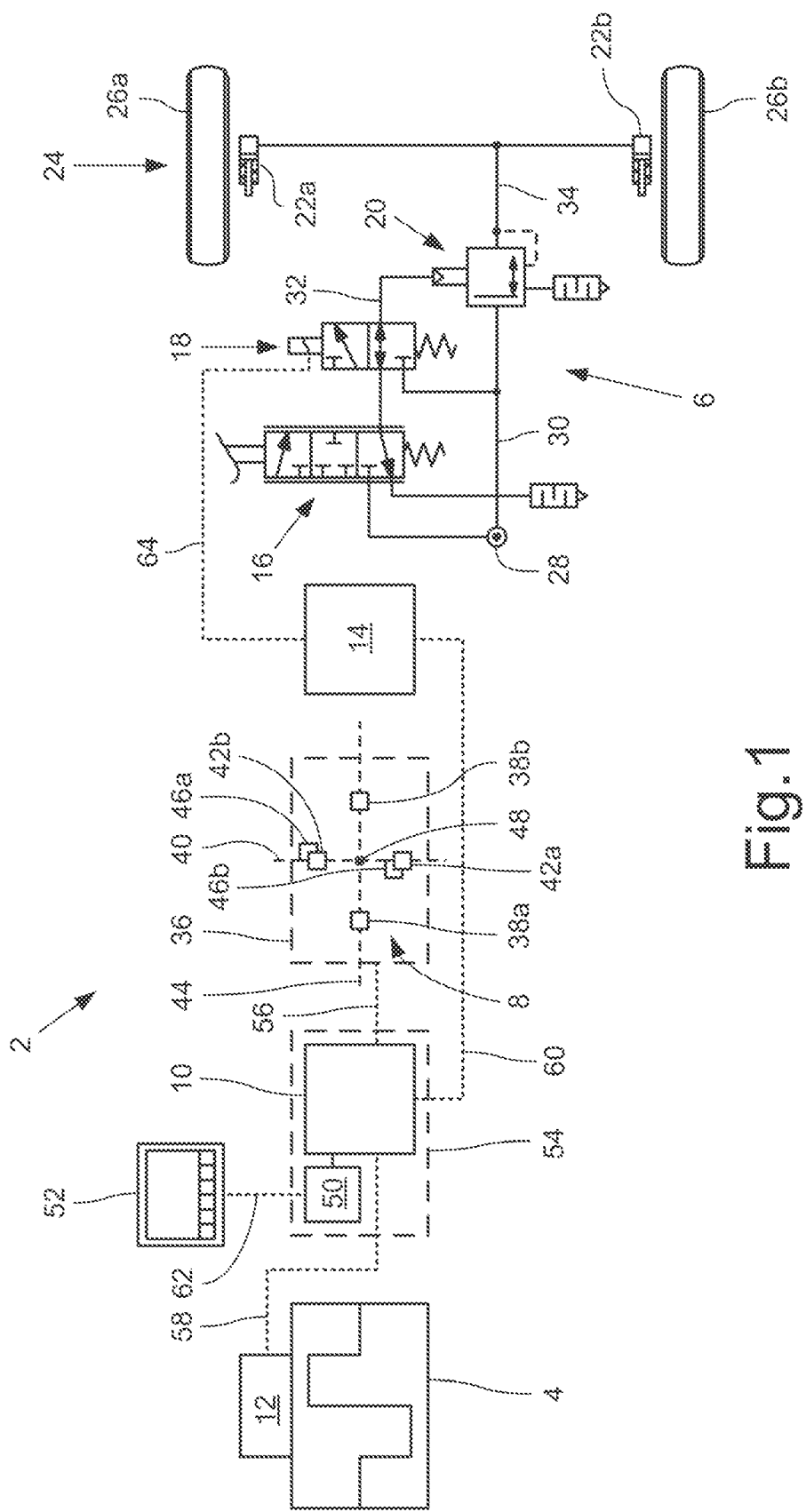
FIG. 1 shows a working vehicle having a control device according to the invention in a schematic view.

The working vehicle 2 shown schematically in FIG. 1 has an electronically controllable drive motor 4, an electronically controllable brake system 6, a sensor arrangement 8 for detecting rotational movements or rotational oscillations about at least one reference axis and an electronic control device 10 for evaluating sensor data of the sensor arrangement 8 and for activating the drive motor 4 or the brake system 6. The drive motor 4 in the present case is configured by way of example as an internal combustion engine and regarding its power output and its rotational speed may be controlled by means of an electronic engine control device 12.

The brake system 6, shown in FIG. 1 only in part and highly simplified, is configured in the present case by way of example as a compressed air brake system and comprises an electronic brake control device 14, a foot brake valve, 16, a changeover valve 18, a relay valve 20 and two wheel brake cylinders 22a, 22b which are arranged on the wheel brakes of the vehicle wheels 26a, 26b of a vehicle axle 24.

The compressed air provided by a compressed air source 28 is present in a supply pressure line 30 which is guided to a supply pressure inlet of the relay valve 20. Additionally a brake control line 32, guided to a control pressure inlet of the relay valve 20, is able to be supplied with a control pressure which lies between the supply pressure and the ambient pressure by an actuation of the foot brake valve 16. The control pressure is converted in the relay valve 20 into a corresponding brake pressure which prevails in an axle brake line 34 connected to the brake pressure outlet of the relay valve 20 and guided to the wheel brake cylinders 22a, 22b of the vehicle axle 24.

The changeover valve 18 is configured as a 3/2-way magnetic switching valve which is activatable by the brake control device 14 and arranged in the brake control line 32. When switching the changeover valve 18, the control pressure inlet of the relay valve 20 is supplied with a supply pressure independently of the current adjusted position of the foot brake valve 16, so that the wheel brake cylinders 22a, 22b of the vehicle axle 14 are then actuated and the working vehicle 2 is braked.

The sensor arrangement 18, which in the present case by way of example is a component of an ESC (Electronic Stability Control) module 36, has two sensors 38a, 38b for measuring a rotational movement or a rotational oscillation about a transverse axis 40 (i.e. for measuring a pitch movement or pitch oscillation of the working vehicle 2), two sensors 42a, 42b for detecting a rotational movement or a rotational oscillation about a longitudinal axis 44 (i.e. for measuring a roll movement or roll oscillation of the working vehicle 2), as well as two sensors 46a, 46b for measuring a rotational movement or rotational oscillation about the vertical axis 48 of the working vehicle 2 (i.e. for measuring a yaw movement or yaw oscillation).

The control device 10 is connected in each case via at least one electrical sensor line 56 to the sensor arrangement 8, via at least one first control line 58 to the engine control device 12 of the drive motor 4 and via at least one second control line 60 to the brake control device 14 of the brake system 6. The brake control device 14 is connected via a third control line 64 to the changeover valve 18.

An electronic data storage 50 is assigned to the control device 10, threshold values for a rotational movement or a rotational oscillation about the transverse axis 40, about the longitudinal axis 44 and about the vertical axis 48 of the working vehicle 2 being stored therein.

The electronic control device 10 is configured to determine from the measured rotational movements or rotational oscillations characteristic values for the respective rotational movement or rotational oscillation about the transverse axis 40, about the longitudinal axis 44 and about the vertical axis 48 of the working vehicle 2 and, as a function of at least one specific characteristic value thereof for a measured rotational movement or rotational oscillation and the assigned threshold value, to decide whether a reduction in the travel speed is required or not.

In the case of a positive decision, the drive motor 4 or the brake system 6 is activated by the control device 10 such that the travel speed of the working vehicle 2 is reduced by the characteristic value until the relevant threshold value is reached or fallen below. The reduction in the travel speed of the working vehicle 2 is carried out by reducing the torque output from the drive motor 4 or by reducing the rotational speed or by venting the wheel brake cylinders 22a, 22b of the vehicle axle 24 so that these have a braking effect.

The threshold values for a rotational movement or a rotational oscillation about the transverse axis 40, about the longitudinal axis 44 and about the vertical axis 48 of the working vehicle 2 may be determined automatically using measured values detected by sensor and, by an identification of the implement fitted on the working vehicle 2, may be stored as a characteristic value in the data storage 50.

Additionally, an input device 52 which is connected to the data storage 50 via a data line 62 is also present in the example shown in FIG. 1. On the input device 52 a driver may identify the implement fitted on the working vehicle 2 by means of an identifier which has been input. Moreover, the driver may input manually the nature of the terrain to be traveled over and the threshold values for a rotational movement or rotational oscillation about the transverse axis 40, about the longitudinal axis 44 and about the vertical axis 48 of the working vehicle 2 and store these in the electronic data storage 50. The control device 10 and the data storage 50 are integrated in the present case by way of example in a speed control system 54 of the working vehicle 2.

Figure 2:
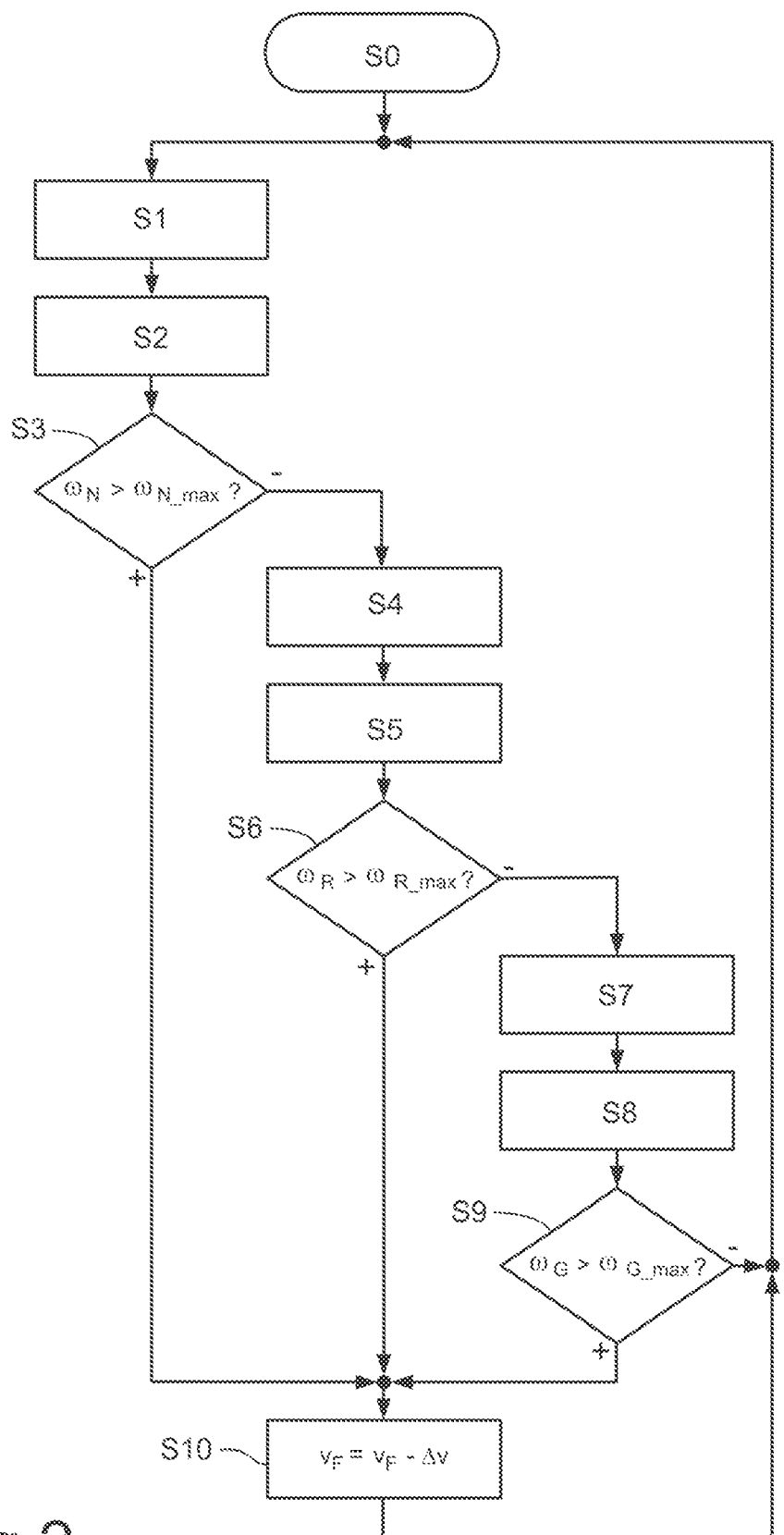
FIG. 2 shows a control method according to the invention in a schematic flow diagram, which may be operated in the control device according to FIG. 1.

The control sequence for measuring by sensor and damping rotational movements or rotational oscillations of the working vehicle 2 about the transverse axis 40, about the longitudinal axis 44 and about the vertical axis 48 thereof is described by way of example hereinafter with reference to the flow diagram illustrated in FIG. 2.

Initially after the start S0 of the method, in method step S1 by evaluating the sensor signals of the sensors 38a, 38b rotational movements or rotational oscillations of the working vehicle 2 about the transverse axis 40 of the working vehicle 2 are measured and in the method step S2 characteristic values relevant thereto are determined therefrom, in this case by way of example a rotational velocity about the transverse axis 40, i.e. a pitch velocity $\omega_N$.

In the following method step S3 it is monitored whether the current pitch velocity $\omega_N$ exceeds a predetermined threshold value for the pitch velocity $\omega_{N\_max}$. If this is relevant, a branching occurs to the method step S10, in which the travel speed $v_F$ of the working vehicle 2 is reduced by a fixed speed difference $\Delta v$. This is carried out in this case by a reduction in the torque output from the drive motor 4 or by an actuation of the wheel brakes on the vehicle axle 24. Then a branching occurs back to before the method step S1.

In the case of a negative result of the monitoring in the method step S3, i.e. when the current pitch velocity $\omega_N$ does not exceed the predetermined threshold value for the pitch velocity $\omega_{N\_max}$, in method step S4 by evaluating the sensor signals of the sensors 42a, 42b rotational movements or rotational oscillations of the working vehicle 2 about the longitudinal axis 44 thereof are measured, and characteristic values in a method step S5, in this case by way of example a rotational velocity about the longitudinal axis 44 of the working vehicle 2, i.e. a roll velocity $\omega_R$, are determined therefrom. In the following method step S6, it is monitored whether the current roll velocity $\omega_R$ exceeds a predetermined threshold value for the roll velocity $\omega_{R\_max}$. If this is relevant, a branching occurs to the method step S10 in which the travel speed $V_F$ of the working vehicle 2 as already described is reduced by the fixed speed difference $\Delta v$. Then a branching occurs back to before the method step S1.

In the case of a negative result of the monitoring in the method step S6, i.e. when the current roll velocity $\omega_R$ does not exceed the predetermined threshold value for the roll velocity $\omega_{R\_max}$, in a method step S7 by evaluating the sensor signals of the sensors 46a, 46b rotational movements or rotational oscillations of the working vehicle 2 about the vertical axis 48 thereof are measured and characteristic values in a method step S8, in this case by way of example a rotational velocity about the vertical axis 48 of the working vehicle 2, i.e. a yaw velocity $\omega_G$, are determined therefrom. In the following method step S9, it is monitored whether the current yaw velocity we exceeds a predetermined threshold value for the yaw velocity $\omega_{G\_max}$. If this is relevant, a branching occurs to the method step S10, in which the travel speed $V_F$ of the working vehicle 2 is reduced by the fixed speed difference $\Delta v$ as described. Then a branching occurs back to the method step S1. In the case of a negative result of the monitoring in method step S9, i.e. when the current yaw velocity we does not exceed the predetermined threshold value for the yaw velocity $\omega_{G\_max}$, a branching occurs directly back to the method step S1.

The control method is activated at the start of the operational travel of the working vehicle 2 having a fitted implement, and performed permanently or at a fixed time interval during operational travel.

While the above description constitutes the preferred embodiments of the present invention, the invention is susceptible to modification, variation and change without departing from the proper scope and fair meaning of the accompanying claims.

LIST OF REFERENCE NUMERALS (PART OF THE DESCRIPTION)

2 Working vehicle
4 Drive motor, internal combustion engine
6 Brake system, compressed air brake system
8 Sensor arrangement
10 Electronic control device
12 Engine control device
14 Brake control device
16 Foot brake valve
18 Changeover valve
20 Relay valve
22a, 22b Wheel brake cylinder
24 Vehicle axle
26a, 26b Vehicle wheel
28 Compressed air source
30 Supply pressure line
32 Brake control line
34 Axle brake line
36 ESC-Module (Electronic Stability Control Module)
38a, 38b Two sensors on transverse axis of working vehicle
40 Transverse axis of working vehicle, first reference axis
42a, 42b Two sensors on longitudinal axis of working vehicle
44 Longitudinal axis of working vehicle, second reference axis
46a, 46b Two sensors on vertical axis of working vehicle
48 Vertical axis of working vehicle, third reference axis
50 Data storage
52 Input device
54 Speed control system
56 Sensor line
58 First control line
60 Second control line
62 Data line
64 Third control line
ESC Electronic Stability Control, electronic driving stabilization
RMS Root Mean Square
S0-S10 Method steps
$v_F$ Travel speed
$\Delta v$ Speed difference
$\omega_G$ Yaw velocity
$\omega_{G\_max}$ Threshold value for yaw velocity
$\omega_N$ Pitch velocity
$\omega_{N\_max}$ Threshold value for pitch velocity $\omega_R$ Roll velocity
$\omega_{R\_max}$ Threshold value for roll velocity

The invention claimed is:

1. A working vehicle (2) for use in agriculture, having a vehicle front and a vehicle rear and being configured for mounting a laterally protruding implement on at least one of the vehicle front and vehicle rear, the working vehicle comprising:
an electronically controllable drive motor (4),
an electronically controllable brake system (6),
a sensor arrangement (8) for measuring rotational movements or rotational oscillations about at least one reference axis (40, 44, 48) of the working vehicle (2), and
an electronic control device (10) for evaluating sensor data of the sensor arrangement (8) and for activating a drive motor (4) or a brake system (6) of the work vehicle,
wherein the sensor arrangement (8) comprises
at least one sensor (38a, 38b) for measuring the rotational movements or the rotational oscillations about a transverse axis (40) of the working vehicle (2),
at least one sensor (42a, 42b) for measuring rotational movements or rotational oscillations about a longitudinal axis (44) of the working vehicle (2), and
at least one sensor (46a, 46b) for measuring rotational movements or rotational oscillations about a vertical axis (48) of the working vehicle (2),
wherein an electronic data storage (50) is assigned to the electronic control device (10) and stores threshold values ($\omega_{N\_max}$, $\omega_{R\_max}$, $\omega_{G\_max}$) for the rotational movements or rotational oscillations about the transverse, longitudinal, and vertical axes (40, 44, 48),
wherein the electronic control device (10) is programmed to determine, from the measured values of rotational movements or rotational oscillations detected by the sensors, characteristic values ($\omega_N$, $\omega_R$, $\omega_G$) of the rotational movements or rotational oscillations about the transverse, longitudinal, and vertical axes (40, 44, 48), respectively,
wherein, as a function of at least one of the characteristic values ($\omega_N$, $\omega_R$, $\omega_G$) and the assigned threshold value ($\omega_{N\_max}$, $\omega_{R\_max}$, $\omega_{G\_max}$), the electronic control device is programmed to decide whether a reduction in travel speed ($V_F$) is required and that upon an affirmative decision, the electronic control device is programmed to activate the drive motor (4) or the brake system (6) such that the travel speed ($V_F$) is reduced until the characteristic value ($\omega_N$, $\omega_R$, $\omega_G$) reaches or falls below the relevant threshold value ($\omega_{N\_max}$, $\omega_{R\_max}$, $\omega_{G\_max}$) by activating the drive motor to reduce the travel speed by reducing a torque output from the drive motor or reducing a rotational speed of the drive motor.

2. The working vehicle as claimed in claim 1, wherein the electronic control device (10) is configured to automatically determine the threshold values ($\omega_{N\_max}$, $\omega_{R\_max}$, $\omega_{G\_max}$) using the measured values, to automatically perform an identification of a fitted implement, and to store the threshold values and the identification in the electronic data storage (50).

3. The working vehicle as claimed in claim 1, further comprising an input device (52) for a manual input of an identifier of a fitted implement, a nature of a terrain to be traveled and the threshold values ($\omega_{N\_max}$, $\omega_{R\_max}$, $\omega_{G\_max}$) for storing the identifier, the nature of the terrain, and the threshold values in the electronic data storage (50).

4. The working vehicle as claimed in claim 1, wherein the sensor arrangement (48) is a component of an electronic stability control module (36) for measuring the rotational movements or rotational oscillations of the working vehicle (2).

5. The working vehicle as claimed in claim 1, wherein the electronic control device (10) is integrated in a speed control system (54).

6. The working vehicle as claimed in claim 1, wherein the travel speed is reduced as a continuous reduction of the travel speed ($V_F$) or as a stepwise reduction of the travel speed until the characteristic value ($\omega_N$, $\omega_R$, $\omega_G$) of the rotational movement or of the rotational oscillation has reached or fallen below the assigned threshold value ($\omega_{N\_max}$, $\omega_{R\_max}$, $\omega_{G\_max}$).

7. The working vehicle as claimed in claim 1, wherein the characteristic value of a respective measured rotational oscillation is determined as an oscillation amplitude or as an RMS value of the measured rotational oscillation, and wherein the predetermined threshold value is a threshold oscillation amplitude or an RMS threshold value.

8. A method for controlling a working vehicle (2) for use in agriculture, having a vehicle front and a vehicle rear and being configured for mounting a laterally protruding implement on at least one of the vehicle front and vehicle rear, the working vehicle having an electronically controllable drive motor (4), an electronically controllable brake system (6), a sensor arrangement (8) for detecting rotational movements or rotational oscillations about at least one of three reference axes (40, 44, 48) of the working vehicle (2), and an electronic control device (10) for evaluating sensor data of the sensor arrangement (8) and for activating a drive motor (4) or a brake system (6), wherein the rotational movements or the rotational oscillations are measured by a sensor of the sensor arrangement, the method comprising the following steps:
determining a characteristic value ($\omega_N$, $\omega_R$, $\omega_G$) for each of the measured rotational movements or rotational oscillations,
comparing each characteristic value ($\omega_N$, $\omega_R$, $\omega_G$) with a respective predetermined threshold value ($\omega_{N\_max}$, $\omega_{R\_max}$, $\omega_{G\_max}$), and
upon determining that the characteristic value ($\omega_N$, $\omega_R$, $\omega_G$) exceeds the threshold value ($\omega_{N\_max}$, $\omega_{R\_max}$, $\omega_{G\_max}$), reducing a travel speed ($V_F$) of the working vehicle (2) until the characteristic value ($\omega_N$, $\omega_R$, $\omega_G$) has reached or fallen below the threshold value ($\omega_{N\_max}$, $\omega_{R\_max}$, $\omega_{G\_max}$);
wherein the step of reducing the travel speed is performed as a continuous reduction of the travel speed ($V_F$) or as a stepwise reduction of the travel speed until the characteristic value ($\omega_N$, $\omega_R$, $\omega_G$) of the rotational movement or of the rotational oscillation has reached or fallen below the assigned threshold value ($\omega_{N\_max}$, $\omega_{R\_max}$, $\omega_{G\_max}$).

9. The method as claimed in claim 8, wherein the characteristic value of a respective measured rotational movement is determined as rotational velocity ($\omega_N$, $\omega_R$, $\omega_G$) or as a rotational acceleration of the measured rotational movement, and wherein the compared predetermined threshold value is a threshold rotational velocity ($\omega_{N\_max}$, $\omega_{R\_max}$, $\omega_{G\_max}$) or a threshold rotational acceleration.

10. The method as claimed in claim 8, wherein the characteristic value of a respective measured rotational oscillation is determined as an oscillation amplitude or as an RMS value of the measured rotational oscillation, and wherein the predetermined threshold value is a threshold oscillation amplitude or an RMS threshold value.

11. The method as claimed in claim 8, further comprising the steps of:
   low-pass filtering the sensor signals for the measured rotational movement the measured rotational oscillation, and
   evaluating the low-passed filtered sensor signals in the electronic control device (10).

12. The method as claimed claim 8, wherein the step of reducing the travel speed is performed as a continuous reduction of the travel speed ($V_F$) until the characteristic value ($\omega_N$, $\omega_R$, $\omega_G$) of the rotational movement or of the rotational oscillation has reached or fallen below the assigned threshold value ($\omega_{N\_max}$, $\omega_{R\_max}$, $\omega_{G\_max}$).

13. The method as claimed claim 8, wherein the step of reducing the travel speed is performed as a stepwise reduction of the travel speed ($V_F$) until the characteristic value ($\omega_N$, $\omega_R$, $\omega_G$) of the rotational movement or of the rotational oscillation has reached or fallen below the assigned threshold value ($\omega_{N\_max}$, $\omega_{R\_max}$, $\omega_{G\_max}$).

14. The method as claimed in one of claims 8, wherein the step of reducing the travel speed is performed by activating the brake system (6) including actuating service brakes of at least one brake circuit of the brake system (6).

15. A method for controlling a working vehicle (2) for use in agriculture, having a vehicle front and a vehicle rear and being configured for mounting a laterally protruding implement on at least one of the vehicle front and vehicle rear, the working vehicle having an electronically controllable drive motor (4), an electronically controllable brake system (6), a sensor arrangement (8) for detecting rotational movements or rotational oscillations about at least one of three reference axes (40, 44, 48) of the working vehicle (2), and an electronic control device (10) for evaluating sensor data of the sensor arrangement (8) and for activating a drive motor (4) or a brake system (6), wherein the rotational movements or the rotational oscillations are measured by a sensor of the sensor arrangement, the method comprising the following steps:
   determining a characteristic value ($\omega_N$, $\omega_R$, $\omega_G$) for each of the measured rotational movements or rotational oscillations,
   comparing each characteristic value ($\omega_N$, $\omega_R$, $\omega_G$) with a respective predetermined threshold value ($\omega_{N\_max}$, $\omega_{R\_max}$, $\omega_{G\_max}$), and
   upon determining that the characteristic value ($\omega_N$, $\omega_R$, $\omega_G$) exceeds the threshold value ($\omega_{N\_max}$, $\omega_{R\_max}$, $\omega_{G\_max}$), reducing a travel speed ($V_F$) of the working vehicle (2) until the characteristic value ($\omega_N$, $\omega_R$, $\omega_G$) has reached or fallen below the threshold value ($\omega_{N\_max}$, $\omega_{R\_max}$, $\omega_{G\_max}$);
   wherein the step of reducing the travel speed is performed by reducing a torque output from the drive motor (4) or by reducing a rotational speed of the drive motor (4).

16. The method as claimed in claim 15, wherein the characteristic value of a respective measured rotational movement is determined as rotational velocity ($\omega_N$, $\omega_R$, $\omega_G$) or as a rotational acceleration of the measured rotational movement, and wherein the compared predetermined threshold value is a threshold rotational velocity ($\omega_{N\_max}$, $\omega_{R\_max}$, $\omega_{G\_max}$) or a threshold rotational acceleration.

17. The method as claimed in claim 15, wherein the characteristic value of a respective measured rotational oscillation is determined as an oscillation amplitude or as an RMS value of the measured rotational oscillation, and wherein the predetermined threshold value is a threshold oscillation amplitude or an RMS threshold value.

18. The method as claimed in claim 15, further comprising the steps of:
   low-pass filtering the sensor signals for the measured rotational movement the measured rotational oscillation, and
   evaluating the low-passed filtered sensor signals in the electronic control device (10).

19. The method as claimed claim 15, wherein the step of reducing the travel speed is performed as a continuous reduction of the travel speed ($V_F$) until the characteristic value ($\omega_N$, $\omega_R$, $\omega_G$) of the rotational movement or of the rotational oscillation has reached or fallen below the assigned threshold value ($\omega_{N\_max}$, $\omega_{R\_max}$, $\omega_{G\_max}$).

20. The method as claimed claim 15, wherein the step of reducing the travel speed is performed as a stepwise reduction of the travel speed ($V_F$) until the characteristic value ($\omega_N$, $\omega_R$, $\omega_G$) of the rotational movement or of the rotational oscillation has reached or fallen below the assigned threshold value ($\omega_{N\_max}$, $\omega_{R\_max}$, $\omega_{G\_max}$).

* * * * *